No. 779,087. PATENTED JAN. 3, 1905.
E. G. LATTA.
TYPE BAR BEARING FOR TYPE WRITING MACHINES.
APPLICATION FILED MAY 14, 1904.
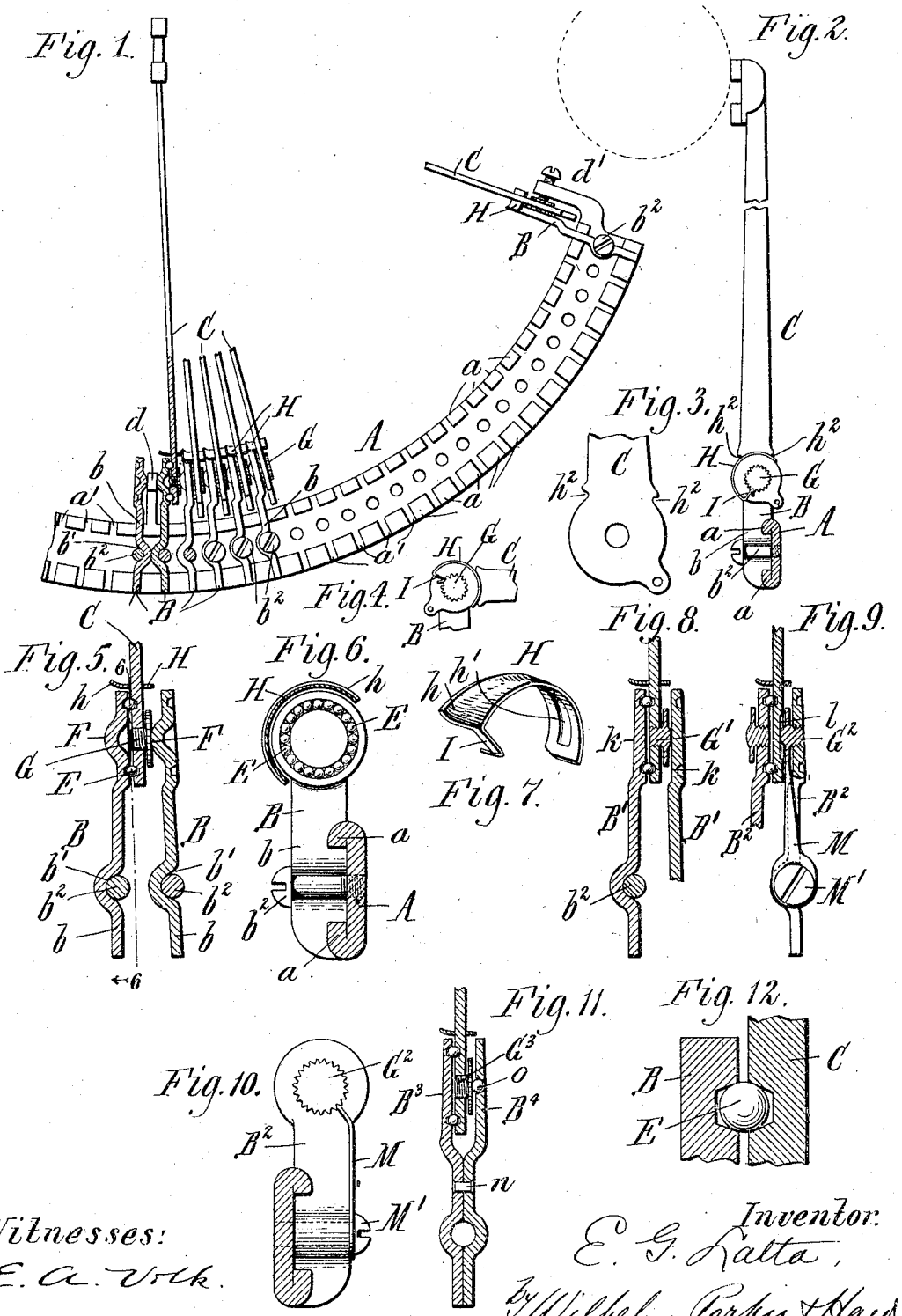

No. 779,087. Patented January 3, 1905.

UNITED STATES PATENT OFFICE.

EMMIT G. LATTA, OF FRIENDSHIP, NEW YORK.

TYPE-BAR BEARING FOR TYPE-WRITING MACHINES.

SPECIFICATION forming part of Letters Patent No. 779,087, dated January 3, 1905.

Application filed May 14, 1904. Serial No. 208,010.

*To all whom it may concern:*

Be it known that I, EMMIT G. LATTA, a citizen of the United States, residing at Friendship, in the county of Allegany and State of New York, have invented new and useful Improvements in Type-Bar Bearings for Type-Writing Machines, of which the following is a specification.

This invention relates to antifriction-bearings for the type-bars of type-writing machines, and more particularly to improvements in antifriction-bearings of the character disclosed in my application for patent, Serial No. 122,352, filed September 6, 1902.

One object of the invention is to provide a light-running antifriction-bearing of simple inexpensive construction which will enable a close compact arrangement of the type-bars on the supporting segment or part and will allow of the independent adjustment of the bearings to take up looseness caused by wear.

A further object of the invention is the provision of a simple, efficient, and inexpensive guard to exclude dust and dirt from the bearing.

In the accompanying drawings, Figure 1 is a fragmentary rear elevation of a type-bar segment, showing a part of the type-bars and hangers thereon, which are provided with bearings embodying my invention. Fig. 2 is a transverse sectional elevation thereof. Fig. 3 is an elevation, on an enlarged scale, of the bearing end of the type-bars. Fig. 4 is a fragmentary sectional elevation similar to Fig. 2, showing the normal or rest position of the type-bar and dust-guard. Fig. 5 is a fragmentary section, on an enlarged scale, showing two of the adjacent hangers and one type-bar. Fig. 6 is a sectional elevation in line 6 6, Fig. 5. Fig. 7 is a perspective view of the dust-guard detached from the type-bars. Fig. 8 is a fragmentary section of a type-bar and two adjacent hangers, showing a modified form of bearing. Fig. 9 is a fragmentary rear elevation, partly in section, of a type-bar and two adjacent hangers, showing still another modification. Fig. 10 is a side elevation, partly in section, of the hanger shown in Fig. 8. Fig. 11 is a fragmentary section showing another form of hanger. Fig. 12 is a detail section of the recess of the ball-bearings.

Like letters of reference refer to like parts in the several figures.

The form of the bearings hereinafter described, and shown in the drawings, is more especially designed for type-writers of the visible-writing kind, wherein the type-bars are mounted beneath the platen on a curved segment and swing upwardly to make the impression at the front side of the platen; but the bearings may be used in other types of machines in which the arrangement and form of the type-bars may vary.

A represents a bearing support or segment, which in the construction shown consists of a curved plate or bar having flanges $a$ projecting from its inner and outer curved edges and provided with slots $a'$ or notches, in which bearing hangers B for the type-bars C are seated and held from lateral displacement or inclination. The hangers in the preferred form of the invention have circular enlarged bearing ends or heads and securing-shanks $b$, which are offset somewhat relative to the bearing ends to make room for the wires which are attached to and operate the type-bars and are provided with recesses $b'$ to receive screws $b^2$, by which the hangers are secured to the segment. The hangers are preferably made in the form shown by stamping from sheet metal. They are arranged radially side by side on the segment, preferably with the hangers at opposite sides of the center of the segment, facing in the opposite directions, as indicated at the left in Fig. 1. The backs of the two center hangers may be shaped to support each other, or they may bear against a fixed center stop $d$, secured to the segment. Stationary abutments $d'$ are provided at the ends of the segment, between which the hangers are confined. A type-bar is pivoted between each end hanger and the adjacent end abutment and between each two hangers except the two at the center of the segment. If desired, all of the hangers can be arranged to face in the same direction. Each type-bar is pivoted to turn on and is supported by a circular row of bearing-balls confined in opposing circular grooves or races in one side of the type-bar and in the proximate side of the bearing end of the hanger for that type-bar, and the parts are held in this relation by a single contact-point at the opposite side of the type-bar, resting against a flat smooth surface at the exact center or axis of the bearing. This result may be accomplished by different constructions. In the construction shown in Figs. 1 to 6 bearing-balls E are confined in circular grooves or races in the proximate faces of the bearing ends of the type-bar and its hanger, and the latter is provided on its opposite side, centrally of the circular row of balls, with a hemispherical contact projection F, formed integrally with the hanger. The ball grooves or races in the type-bar and hanger are of the same form, (see Fig. 12,) each being, preferably, a shallow V-groove with a flat full bottom to avoid weakening the thin sheet metal more than is necessary for the bottom to clear the balls. Both the inner and outer circular inclined faces of the ball-grooves bear near their outer edges on the balls, and the grooves are so proportioned as to width relative to the size of the balls used that the opposing faces of the type-bar and its hanger nearly contact. The inclination of the sides of the ball-grooves is such that they clear the balls except at points near the faces of the hanger and type-bar, and the nearer these bearing-points are to the edges of the grooves the better the bearing works. With this form of the grooves the balls will revolve around in them without twisting movement, common in bearings of the usual form. While the described form of the bearing-grooves is preferred, grooves made of the same section as the balls will produce a fairly desirable bearing.

G, Figs. 1 to 5, is an adjusting-screw which is screwed into a threaded hole located centrally in the bearing end of the type-bar and has a head which contacts at its exact center with the contact projection or point F of the adjoining hanger. The head of the screw is flat and smooth and exactly parallel with the ball-groove in the other side of the type-bar. The contact-point or center rest is simply to hold the type-bar and its hanger in proper relation with the balls and form a center rest to prevent lateral motion of the type-bar. The balls form the journal or pivot on which the type-bar swings, and the center rest is not a pivot or journal for the type-bar. As the center rest is exactly at the axis about which the type-bar swings, there is considerably less friction in the complete bearing than in a bearing in which a cone seated in a corresponding seat is used. There is no sliding movement of one part on the other except that between the type-bar and the center rest, and as this is at the exact axis of the bearing the friction is so small as to produce an exceedingly free moving bearing. The bearing can be quickly adjusted by turning the adjusting-screw to take up looseness caused by wear, so that the expense, noise, and friction of a guide at the printing-point is avoided. The adjusting-screw is held from movement after adjustment as hereinafter described. Any one of the hangers may be detached with its type-bar without disturbing its neighboring hanger; but care must be taken to hold the type-bar in place on the hanger to prevent the loss of the balls, and the adjoining type-bar should be tied to its hanger before the removal of the detached hanger.

H, Figs. 1, 2, 4 to 7, represents semicircular dust guards or shields one of which is secured to each type-bar and projects laterally to both sides thereof and overhangs the circular bearing ends of the hangers at opposite sides of the type-bar. The guard is curved on a radius slightly greater than the bearing end of the hanger, so that it can vibrate with the type-bar without touching the adjacent hangers. The length and normal position of the dust-guard is such that its lower or front end is in near proximity to the front edge of the hanger, while its upper end extends far enough rearwardly to overhang the whole bearing, but terminates a sufficient distance above the hanger to permit it to swing with the type-bar without striking the rear edge of the hanger. The side edges of adjacent guards nearly touch, so that the guards very effectually prevent dust and other foreign substances from falling into the bearings. The side of each dust-guard which is toward the center of the segment curves outwardly somewhat at $h$, Fig. 7, or is of somewhat larger radius than the other side, so that dirt falling sidewise off of one guard will be deflected onto the next lower guard and will not fall into the space between the guards. This formation is desirable more particularly for the guards at the ends of the segment, where they occupy a more nearly upright position. The guard is preferably formed of thin spring metal and is provided with a slot $h'$, Fig. 7, whereby it can be slipped over the type-bar before the type-head is secured thereon and sprung into retaining-notches $h^2$, Fig. 3, in the opposite edges of the bar.

The dust-guard employed in the bearing construction already described is provided with an extension or finger I, Figs. 2, 4, and 7, which is bent inwardly and bears against the serrated edge of the head or flange of the adjusting-screw G and acts as a spring-detent to hold the screw against its very insignificant tendency to work loose owing to the vibrations of the type-bar. In adjusting the bearing a special spanner or wrench is employed, which is engaged with the serrated head of the adjusting-screw. The spring-detent I will yield to permit the adjustment of the screw.

Fig. 8 shows a slightly different construction in which the adjusting-screw G' is carried by the type-bar and has a hemispherical projection to rest against a beveled face $k$ on the back of the hanger B' for the next type-bar. The beveled face $k$ of one hanger is parallel with the ball-race in the type-bar supported by the next hanger.

In the modified construction of the bearing shown in Figs. 9 and 10 the adjusting-screw $G^2$ works in a threaded hole in the hanger $B^2$ and is provided with a rounded projection or contact-point which bears centrally against the flat bottom of a circular recess $l$ in the adjacent face of the next type-bar to form the center rest therefor. The recess $l$ locates the center contact-point nearer to the plane of the bearing-balls for the type-bar, which is an advantage, as it tends to better hold the bar. The recess also more effectually excludes dust from the center rest. As the adjusting-screw is on the hanger, the dust-guard cannot be employed to hold it, and a separate detent or part M is provided to hold the screw. This detent consists of a piece of sheet metal having a spring-finger which engages the serrated head of the adjusting-screw. It is secured on the hanger by the securing-screw M' for the latter, which passes through an elongated slot in the detent. When the bearing-screw is to be adjusted, the securing-screw M' for the hanger is loosened and the detent moved down out of engagement with the adjusting-screw and turned out of the way of the wrench used for turning the adjusting-screw. After adjustment the detent is returned to its holding position and secured by tightening the screw M'. In other respects this bearing and its dust-guard are similar to those before described.

Still another construction is shown in Fig. 11, in which the hanger consists of two parts $B^3 B^4$, connected by a rivet $n$. The part $B^3$ is similar to the single piece-hanger shown in Figs. 1 to 6. The part $B^4$ retains the bearing-balls in their grooves when the hanger is detached from the segment, and it can be turned on the rivet when the hanger is detached from the segment to permit the removal of the type-bar. The center rest for the type-bar in this form of the hanger consists of a ball $o$, held in a socket in the part $B^4$ of the hanger and bearing against the flat head of the adjusting-screw $G^3$, carried by the type-bar. This hanger is desirable principally because the bearing-balls and type-bar are retained in place on the hanger when the latter is detached from the segment. The hangers shown in this view, Fig. 11, are arranged on the segment with the sides of their bearing ends in contact to mutually support each other.

In all of the bearings described the construction and arrangement is such that each hanger is laterally supported by the adjoining hangers on opposite sides thereof, either mediately or immediately.

A common and important feature of all of the bearings described is the arrangement of the bearing-balls in opposable grooves in one side of the hanger and the proximate side of the type-bar and the single center contact point or rest at the opposite side of the type-bar and bearing against a flat smooth surface at the exact center or axis of the bearing for retaining the parts in proper position and enabling the adjustment of the bearing.

I claim as my invention—

1. The combination of a type-bar, a bearing part, bearing-balls located between one side of said type-bar and said bearing part and confined in opposing grooves in said type-bar and bearing part, and a center bearing at the opposite side of the type-bar comprising a flat surface, and a reduced part which bears against said flat surface at the pivotal axis only of said type-bar, substantially as set forth.

2. The combination of a bearing part having a circular ball-groove, a type-bar having in one side a circular ball-groove and on the other side a plain face, bearing-balls in said grooves, and a reduced part which bears against said plain face at the pivotal axis only of said type-bar, substantially as set forth.

3. The combination of a type-bar, and a hanger for the same, each having a circular ball-groove, balls confined in said grooves, the grooves being of the same size and each adapted to rest with both its inner and outer faces in contact with the balls, and a center bearing for holding the type-bar and hanger in contact with the balls comprising a reduced part bearing against a flat surface, substantially as set forth.

4. The combination of a type-bar, and a hanger, each having a circular ball-groove, an interposed row of balls, and an adjustable side support for holding the type-bar in place comprising a screw and an opposing part against which the screw bears at the pivotal axis only of said type-bar, substantially as set forth.

5. The combination with a series of alternate type-bars, and hangers, and a circular row of balls between each type-bar and its hanger, of a separate adjusting device acting between each type-bar and the adjacent hanger for the next bar of the series, substantially as set forth.

6. The combination of a type-bar, and its hanger, having opposable circular ball-races of the same size and formed to bear on interposed balls at both the inner and outer sides of the races, balls in said races, a plain flat surface parallel with the plane of the row of balls, and a bearing-point resting against said flat surface at the axial center of the bearing, and acting to hold the bar and hanger in contact with the balls, substantially as set forth.

7. The combination of a type-bar, its hanger, a plain flat surface attached to one of these parts and a hemispherical projection on the other part, means for adjusting the hemispherical part with relation to the flat surface, and a circular row of balls between said type-bar and hanger, substantially as set forth.

8. The combination of a series of type-bars, pivotal bearings therefor, and dust-guards carried by said type-bars, the dust-guard on one type-bar overlapping that on the neighboring type-bar, substantially as set forth.

9. The combination of a type-bar, a pivotal bearing therefor, and a dust-guard for said bearing carried by the type-bar and comprising a piece which is self-retained on and is separable from said type-bar, substantially as set forth.

10. The combination of a type-bar, a pivotal bearing therefor, and a curved dust-guard for said bearing carried by the type-bar and which is applied to the type-bar by extending its ends and is self-retained in position on the type-bar by its tendency to resume the curved form, substantially as set forth.

11. The combination with a type-bar, of a slotted sheet-metal dust-guard adapted to pass over the end of the bar and be seated thereon, substantially as set forth.

12. The combination with a type-bar having a notch in its edge, of a curved sheet-metal dust-guard adapted to be sprung into the notch and support itself on the type-bar, substantially as set forth.

13. The combination with a series of type-bars, of a series of laterally-projecting dust-guards, the projection of the guards on one side of the type-bars being of greater radius than on the other side of the bars, substantially as set forth.

14. The combination with a type-bar, and hanger having a jointed connection, of an adjustable screw working in the type-bar, and a dust-guard on the bar arranged to act as a detent for the screw, substantially as set forth.

Witness my hand this 11th day of May, 1904.

EMMIT G. LATTA.

Witnesses:
 H. L. BLOSSOM,
 S. A. WALES.